United States Patent [19]
Erich, Jr.

[11] Patent Number: 4,754,438
[45] Date of Patent: Jun. 28, 1988

[54] GEOPHONE TESTING APPARATUS

[75] Inventor: Otis G. Erich, Jr., Brea, Calif.

[73] Assignee: Union Oil Company of California, Los Angeles, Calif.

[21] Appl. No.: 734,561

[22] Filed: May 15, 1985

[51] Int. Cl.⁴ .......................................... H04B 17/00
[52] U.S. Cl. ..................................................... 367/13
[58] Field of Search ......................... 367/13; 73/1 DV

[56] References Cited

U.S. PATENT DOCUMENTS

| | | | |
|---|---|---|---|
| 3,858,169 | 12/1974 | Bardeen | 367/13 |
| 4,003,018 | 1/1977 | McCormick | 367/13 |
| 4,043,175 | 8/1977 | Fredriksson et al. | 367/13 |
| 4,296,483 | 10/1981 | Haill | 367/13 |
| 4,391,124 | 7/1983 | Drost et al. | 367/13 |
| 4,392,213 | 7/1983 | Kung et al. | 367/13 |

OTHER PUBLICATIONS

Schilling et al, Electronic Circuits, 1979, pp. 798–800.

Primary Examiner—Thomas H. Tarcza
Assistant Examiner—Daniel T. Pihulic
Attorney, Agent, or Firm—Howard R. Lambert; G. Wirzbicki; D. Sandford

[57] ABSTRACT

The invention is an apparatus for obtaining a step function response signal from a geophone, comprising: (1) a controllable source of current; (2) a means for producing a switching pulse; (3) an electronic connecting means for applying current from the source to the geophone, while the pulse is being produced; and (4) an electronic connecting means for conducting the response signal from the geophone to a data acquisition system, after the pulse has been produced. Preferably, a time delay means is used to delay the connecting of the signal to the data acquisition system, for a time after the pulse has been produced.

3 Claims, 1 Drawing Sheet

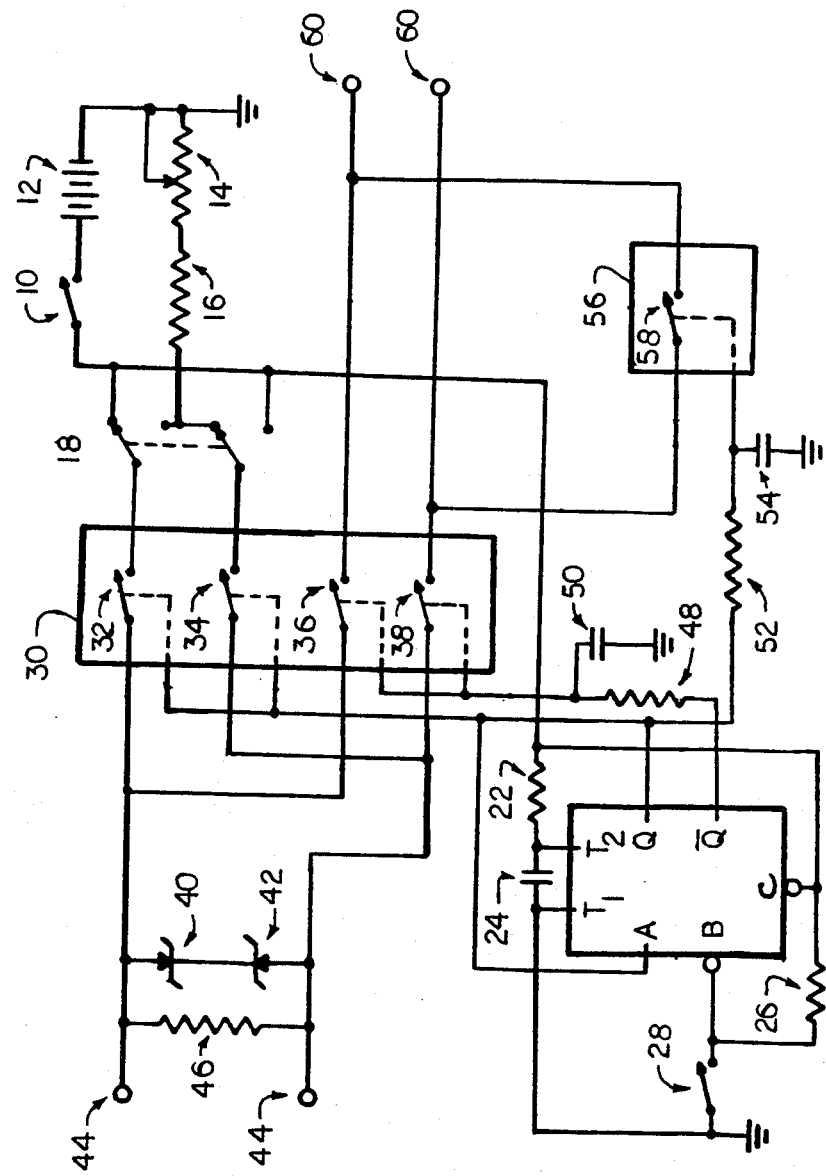

GEOPHONE TESTING APPARATUS

BACKGROUND OF THE INVENTION

1. Field of the Invention

The present invention relates to the field of electrical testing and, more particularly, to devices for testing the response of geophones.

2. Description of the Art

Seismic mapping of subterranean geologic features involves the use of a seismic energy source and reception by seismic detectors. When used on land, the source of seismic energy can be an explosive charge which is detonated in a bore hole located at a selected point in a plot of land, or can be another energy source which delivers a series of impacts to the surface of the earth. For marine mapping, the energy source can be an explosive charge, an airgun, an imploder, or the like, which creates pressure waves. Acoustic waves from an energy source move through the earth and are transmitted back from pronounced strata boundaries; transmitted waves reach the surface after varying time intervals, depending upon the distance and nature of subsurface materials traversed.

The returning acoustic waves are detected by devices called geophones (on land) or hydrophones (for marine use), which convert the waves into electrical signals. In seismic mapping, it is common to use numerous detectors, electrically interconnected in series, parallel, or series-parallel arrangements called "strings." It is also common to use multiple strings, called an "array," to receive the acoustic waves.

Typical geophones used in seismic exploration consist of a coil of wire, suspended by springs in the field of permanent magnet. Seismic waves which impact the geophone cause a relative motion between the coil and magnet, thereby generating an electrical signal, the characteristics of which are related to the amplitude and frequency of the waves. The geophones are manufactured to close tolerances, to obtain a maximum degree of uniformity in their electrical signal outputs for a given mechanical input. However, signal characteristics tend to change in a random manner over time, as the geophones are handled and used repeatedly.

Due to these changes, methods have been devised for determining response characteristics of the geophones. One method involves mounting a geohpone to be tested on a shake table, adjacent a "standard" geophone. The two geophones are vibrated and their outputs are compared. Another test involves applying a steady-state oscillating signal to a geophone and measuring the signal generated by the geophone, which opposes the applied signal.

A more comprehensive test can be obtained by applying a constant DC current to the geophone, which creates a magnetic field in the coil and causes displacement of the coil away from its resting position within the permanent magnet. Removing the applied current causes the magnetic field in the coil to collapse, permitting the coil to return to its original resting position, which return will include certain oscillations about the resting position due to the influence of the suspending springs. Movement of the coil within the field induces an electrical signal in the coil; this signal can be compared to signals generated by other geophones which receive similar DC test voltages. This testing method yields what is generally denoted the "step function response" of a geophone.

However, when the magnetic field in the coil collapses, a rather strong voltage is rapidly formed in the coil, independently of the less rapidly generated test signal due to movement of the coil. This voltage interferes with recording and processing operations for the step function test signal.

U.S. Pat. No. 4,392,213 to Kung et al. shows the use of a delay period, after displacing the coil with an applied voltage, before the geophone-generated step function signal is recorded. This technique allows the strong interfering voltage to decay before the desired information is acquired, greatly simplifying test data acquisition and processing. The apparatus of Kung et al., however, is complicated, utilizing clock, timer, and relay circuitry to perform geophone step function testing.

SUMMARY OF THE INVENTION

This invention is an apparatus for obtaining a step function response signal from a geophone, comprising: (1) a controllable source of current; (2) a means for producing a switching pulse; (3) an electronic connecting means for applying current from the source to the geophone, while the pulse is being produced; and (4) an electronic connecting means for conducting the response signal from the geophone to a data acquisition system, after the pulse has been produced. Preferably, a time delay means is used to delay the connecting of the signal to the data acquisition system, for a time after the pulse has been produced.

In one embodiment of the invention, a switching pulse is produced by a monostable multivibrator, the outputs of which are used to close electronic switches, connecting a current source to the geophone under test for a desired period of time and connecting the geophone to a data acquisition system after the period of time has ended. Appropriate time delays are provided by resistor-capacitor networks.

BRIEF DESCRIPTION OF THE DRAWING

The drawing is a circuit diagram, showing one embodiment of the present invention.

DESCRIPTION OF THE INVENTION

The present invention is useful for step function testing single geophones or combinations of geophones in strings. Signals generated by various geophones or strings of geophones can be recorded and correlated, permitting the computation of response correction data and facilitating the comparison of seismic information obtained with the various geophones.

Referring to the accompanying drawing, there is shown one embodiment of the invention. In the drawing, switch 10 is used to apply power to the diagrammed circuit from battery 12, which can be a 9-volt transistor battery. Rheostat 14, typically about 150 K ohms, with series resistor 16, typically less than about 100 ohms, controls the current which is applied to polarity reversing switch 18.

Electronic switch module 30, which can be an integrated circuit such as the CMOS type 4066, is shown as containing four independent single pole, single throw controllable switch elements. Current from the polarity switch 18 is applied to one pole each of switch elements 32 and 34.

A switching pulse is produced by monostable multivibrator 20, which can be half of a CMOS integrated circuit type 4528 dual retriggerable monostable multivibrator. "On" time of the multivibrator is controlled by appropriate values of resistor 22 and capacitor 24; a pulse of approximately 1.5 seconds duration can be obtained using a capacitor value about 25 μF and a resistor about 150K ohms. Input "B" to the multivibrator is given a positive bias through resistor 26, but momentarily closing switch 28 causes the input to receive a negative-edge triggering pulse, which turns the multivibrator "on" by causing the "Q" output to become high. When Q becomes high, switch elements 32 and 34 close. Retriggering of the multivibrator during a pulse is prevented by connecting Q to the "A" input.

When switch elements 32 and 34 and closed, current is directed from the battery 12 toward terminals 44, which are normally connected to a geophone or geophone string. Zener diodes 40 and 42, which typically have a zener voltage rating about 2.5 volts, protect the circuit and connected equipment against accidentally applied high voltages, while resistor 46, which can have a 1M ohm rating, is present to help protect the circuit against the possible presence of static charges in the geophone to be tested. Current present at terminals 44 can be used to displace the coil of a geophone, as previously discussed.

During the multivibrator "on" time, capacitor 54 is charging through resistor 52, eventually causing switch element 58, in a second electronic switch module 56, to close. This shorts together terminals 60, which terminals can be connected to any of the various recorders, etc., which are commonly used for seismic data acquisition. Switch module 56 can be an integrated circuit device, such as a type 4066.

At the conclusion of the multivibrator "on" time, the Q output becomes low and the $\bar{Q}$ output becomes high. The $\bar{Q}$ voltage charges capacitor 50 through resistor 48, eventually causing switch elements 36 and 38, in the first switch module 30, to close, thereby connecting terminals 44 with terminals 60. Thus, a geophone coil attached to terminals 44 will be connected with a seismic data acquisition system which is connected to terminals 60.

Further, removal of the Q output voltage will cause capacitor 54 to discharge, eventually causing switch 58 to open and unshort terminals 60. Opening of switch 58 should be coordinated with the closing of switches 36 and 38; sufficient delay in either the closing of switches 36 and 38, or the opening of switch 58, or both, should be present after the Q output becomes low, to permit undesired, rapid signals (from the geophone coil collapsing magnetic field) to decay and not be presented to a data acquisition system. Appropriate circuit time constants are provided by values of resistors 48 and 52 about 10K ohms, of capacitor 50 about 0.022 μF, and of capacitor 54 about 0.12 μF. With such values, approximately 1.5 milliseconds delay will be observed between opening of switch 58 and appearance of signal at terminals 60, and a geophone step function signal will not contain undesired signals.

Use of the described components is presently preferred, primarily due to the very low power requirements of CMOS devices and an ability to construct the apparatus in a small (pocket-size) package. However a properly functioning apparatus can be constructed using TTL integrated circuits, or discrete transistor multivibrator and switching circuits, without departing from the invention, keeping in mind that it is desired to use electronic switching devices, thereby avoiding electromechanical switches (such as relays). It is also expected that the values of resistors and capacitors can be adjusted, as required to obtain optimum pulse length and time delay characteristics for different circuit components and various geophones.

Another modification, which can be advantageous, is the use of monostable multivibrators in place of one or more of the resistor-capacitor delay networks. The use of cascaded monostable multivibrators for pulse delay is well known in the art. This modification would give greater uniformity to the switching time periods, but with the cost of greater circuit complexity.

An external switching device can be connected in parallel with switch 28, for remote starting of the test sequence. This feature can be used, for example, to initiate a step function test simultaneously with detonation of an explosive charge for seismic wave generation; a step function response could thereby be obtained just before seismic waves reach the geophone strings, facilitating more meaningful data collection.

Shorting switch 58 is an optional feature of the apparatus of the invention, since it serves only to protect any data acquisition system which might be connected to terminals 60 against extraneous potentially damaging signals generated before the step function signal is to be recorded. Such a shorting device is, however, highly recommended.

While various specific embodiments and modifications of this invention have been described in the foregoing specification, further modification will be apparent to those skilled in the art. Such further modifications are included within the scope of this invention as defined by the following claims.

I claim:

1. Apparatus for obtaining a step function response signal from a geophone, comprising:
   (a) a controllable source of current;
   (b) means for producing a switching pulse, comprising a monostable multivibrator which is capable of concurrently producing a positive-going pulse Q and a negative-going pulse $\bar{Q}$;
   (c) electronic connecting means, comprising an electronic switch which is closed during said pulse Q, for applying current from said source to said geophone; and
   (d) electronic connecting means, comprising an electronic switch which is closed following a termination of said pulse $\bar{Q}$, for conducting said response signal from said geophone.

2. The apparatus defined in claim 1, further including time delay means for delaying the conducting of said response signal for a time after termination of said pulse $\bar{Q}$.

3. The apparatus defined in claim 1, wherein said time delay means comprises a resistor-capacitor network.

* * * * *